(12) United States Patent
Morris

(10) Patent No.: US 8,950,108 B1
(45) Date of Patent: Feb. 10, 2015

(54) FLY TRAP

(76) Inventor: Calvin D. Morris, Albuquerque, NM (US)

( * ) Notice: Subject to any disclaimer, the term of this patent is extended or adjusted under 35 U.S.C. 154(b) by 154 days.

(21) Appl. No.: 13/469,398

(22) Filed: May 11, 2012

(51) Int. Cl.
*A01M 1/10* (2006.01)

(52) U.S. Cl.
USPC .............................................. 43/107

(58) Field of Classification Search
USPC ............ 43/107, 65, 119, 132.1, 122; 119/432
See application file for complete search history.

(56) References Cited

U.S. PATENT DOCUMENTS

| | | | | |
|---|---|---|---|---|
| 862,079 | A * | 7/1907 | Lenthier | 43/122 |
| 985,840 | A | 3/1911 | Rockley | |
| 1,053,251 | A * | 2/1913 | Verzani | 43/119 |
| 1,134,875 | A | 4/1915 | Lampel | |
| 1,210,032 | A | 12/1916 | Bedore | |
| 1,255,485 | A | 2/1918 | Stoffel | |
| 1,257,528 | A * | 2/1918 | Plank | 211/11 |
| 1,320,017 | A | 10/1919 | Lurz | |
| 1,520,135 | A | 3/1925 | Morgan | |
| 1,544,334 | A * | 6/1925 | Martin | 43/119 |
| 2,023,311 | A * | 12/1935 | Davies | 43/65 |
| 4,103,449 | A * | 8/1978 | Vasquez | 43/111 |
| 4,310,985 | A * | 1/1982 | Foster et al. | 43/131 |
| 5,257,474 | A | 11/1993 | Burgos | |
| 5,957,086 | A * | 9/1999 | Gallardo | 119/429 |
| 6,158,165 | A * | 12/2000 | Wilson | 43/66 |
| 6,493,986 | B1 * | 12/2002 | Nelson et al. | 43/113 |
| 7,222,453 | B2 * | 5/2007 | Uhl | 43/122 |

* cited by examiner

*Primary Examiner* — Christopher P Ellis
*Assistant Examiner* — Jessica Wong
(74) *Attorney, Agent, or Firm* — Robert C. Montgomery; Montgomery Patent & Design

(57) ABSTRACT

A large fly trap apparatus designed for use around livestock and other outdoor areas to attract and trap flies without bait. The apparatus includes a base and a cylindrical canopy having a plurality of conical feeder tubes for entrance into a trap chamber. The canopy is formed from a plurality of support frames covered by a mesh covering. The feeder tubes allow flies to land on the outside of the mesh cover and crawl through the funnel-shaped feeder tubes into the trap chamber, where they become trapped.

16 Claims, 8 Drawing Sheets

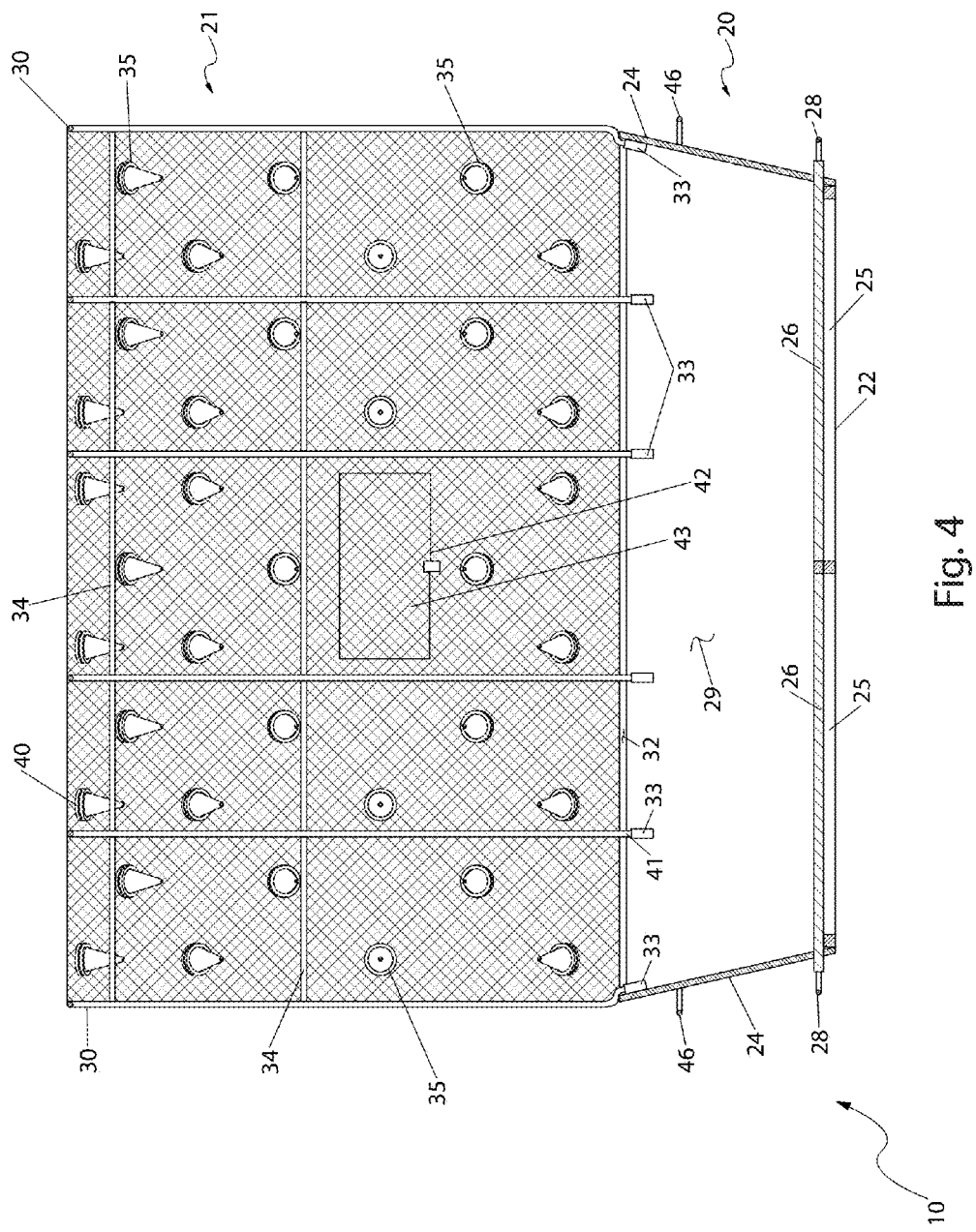

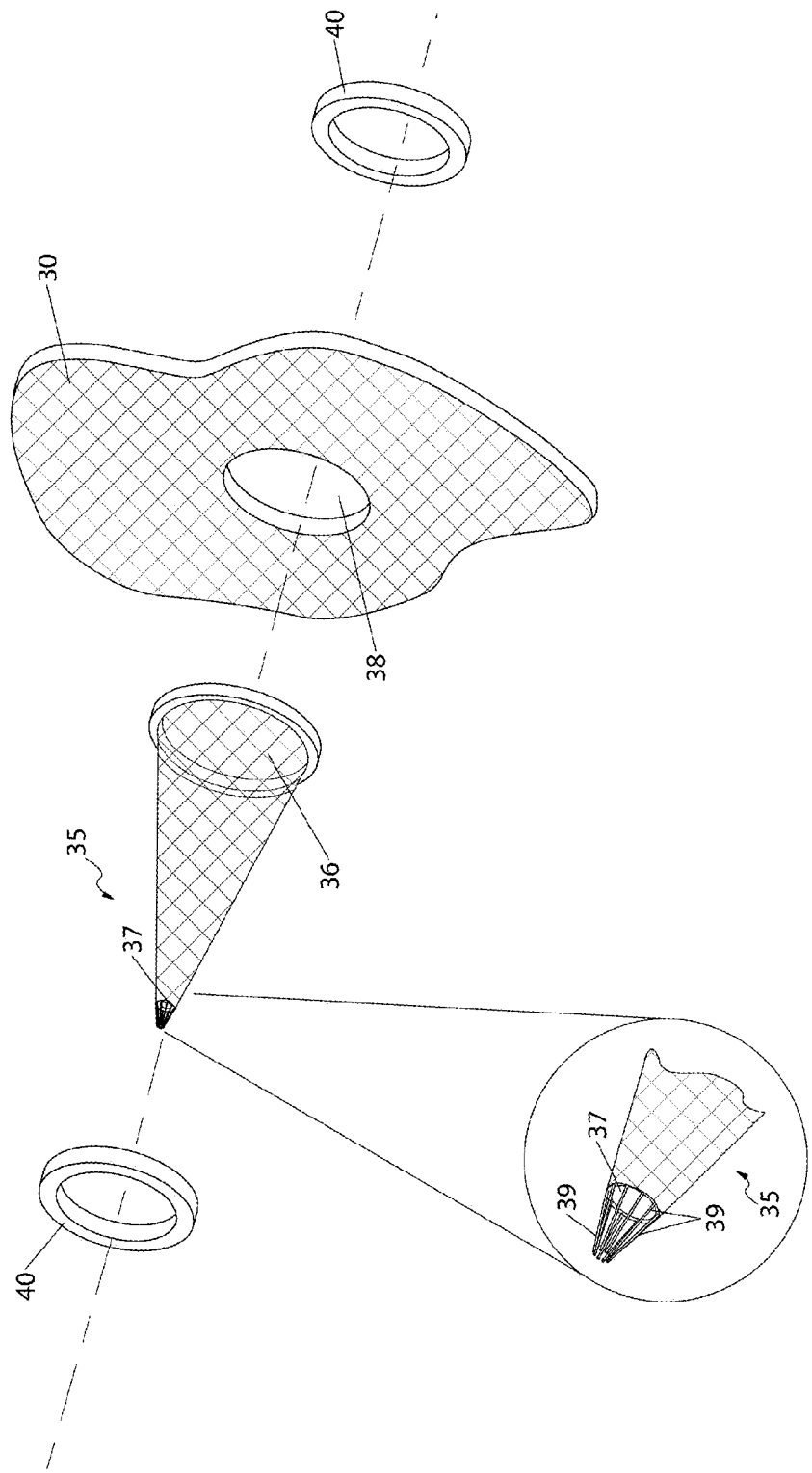

FLY TRAP

RELATED APPLICATIONS

Not Applicable.

FIELD OF THE INVENTION

The present invention relates generally to fly traps, and in particular, to a large outdoor fly trap to trap flies that infest pastures or other outdoor areas.

BACKGROUND OF THE INVENTION

Flying insects, such as flies, are persistent problems in almost all areas of the world. In order to control such pests, people have resorted to various methods to eradicate them, such as chemicals, adhesive traps, and even electric-based eradication devices. However, each of these devices typically have some sort of disadvantage whether it be the requirement of a suitable electric power source, the use of dangerous chemicals, or adhesive based traps which must be frequently changed out. Many of these disadvantages then surface in locations where such traps are extremely impractical. Examples of such locations are large livestock areas in which cattle, sheep, horses, and other animals are kept and where the total numbers of insects makes those traditional traps impractical.

SUMMARY OF THE INVENTION

The inventor has recognized the aforementioned inherent problems and lack in the art and observed that there is a need for a means by which flying insects, such as flies, can be easily trapped and captured in large outdoor areas without the disadvantages as described above. The principles of the present invention provide for a fly trap to address this identified need.

Accordingly, it is an object of the present embodiments of the invention to address this need by providing a device that simple to operate and has a capacity to trap very large numbers of insects.

It is another object of the present invention to provide a device that does not require the use of external power or bait mechanisms.

It is another object of the present invention to provide a device that is safe for people and animals which may be nearby.

Still another object of the present invention is to provide a device that easily transportable and can be used in various remote locations.

The inventor has thus realized the advantages and benefits of providing a fly trap apparatus having various features for accomplishing at least one of the aforementioned objects.

A feature of the present invention is that the apparatus includes a base having longitudinal and lateral sidewalls, a bottom, and an open top defining a hollow base interior. A plurality of generally "C"-shaped support frames is attachable to the base. A screen mesh is attached around the plurality of support frames defining a generally cylindrical hollow canopy interior. A trap chamber is defined by the base interior and the canopy interior, in combination, for collecting a plurality of flies. A plurality of apertures is disposed throughout the screen mesh. A plurality of feeder tubes depends inwardly from the plurality of apertures and is adapted to provide an entrance into the trap chamber for the plurality of flies.

Another feature of the present invention is that the feeder tubes include a conical shape having a large opening affixed to a perimeter of each of the apertures for entrance into the feeder tube and a small opening for exiting the feeder tube. The small opening includes a plurality of semi-rigid strands projecting outwardly from a perimeter edge for providing a one-way passage.

Another feature of the present invention is that the base includes base includes a pair of cut-outs disposed in the bottom and a pair of removably inserted trays for covering the cut-outs. The sidewalls are disposed at an obtuse outward angle relative to the bottom to direct a plurality of fly carcasses toward the cut-outs.

Another feature of the present invention is that the base includes a base a plurality of spaced apart sleeves affixed to an interior of opposing longitudinal sidewalls for attachment of the support frames. Opposing ends each of the support frames includes an outwardly bent leg for insertion into the sleeves.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 4 is longitudinal cross section view of the fly trap in accordance with FIG. 3;

FIG. 5 is an exploded view of a portion of a screen mesh and feeder tube of the fly trap;

FIG. 6 is an enlarged view of a small opening of the feeder tube in accordance with FIG. 5;

Figure 1:
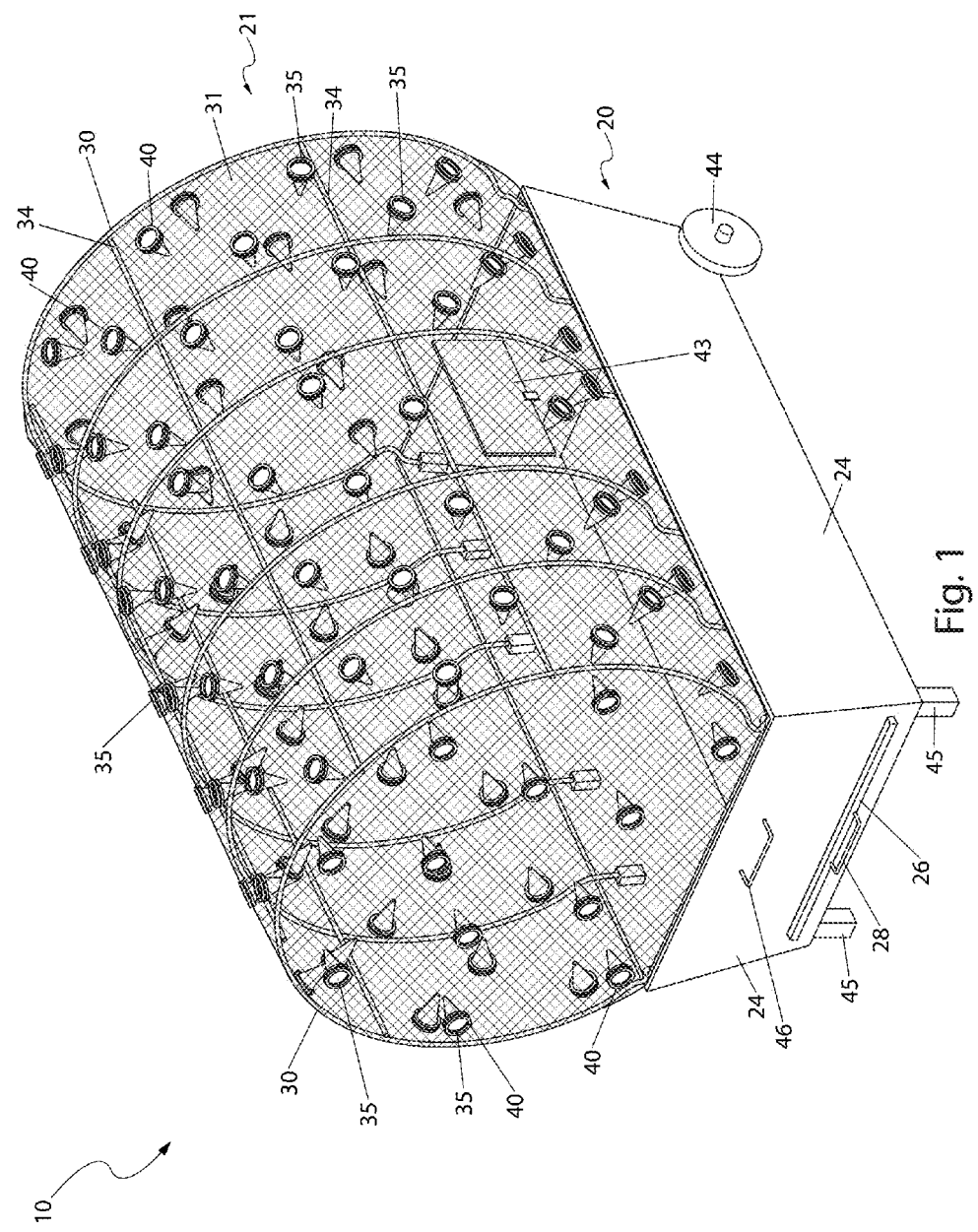
FIG. 1 is a perspective view of a fly trap in accordance with the present invention.

DESCRIPTIVE KEY 10 fly trap
20 base
21 canopy
22 bottom
23 open top
24 sidewall
25 cut-out
26 tray
27 tray slot
28 tray handle
29 chamber
30 support frame 31 screen mesh
32 open bottom
33 sleeve
34 cross support
35 feeder tube
36 large opening
37 small opening
38 apertures
39 strand
40 ring
41 leg
42 access opening
43 access door
44 wheel assembly
45 support feet
46 base handle
47 end support frame
50 starter tube
51 frame
52 chamber
53 end cap
53a lower end cap
53b upper end cap
54 longitudinal support
55 screen mesh
56 aperture
57 feeder tube
58 large opening
59 small opening
60 strand
61 lid
62 clasp
63 opening
64 handle
65 legs

DETAILED DESCRIPTION OF THE PREFERRED EMBODIMENT

In accordance with the invention, the best mode is presented in terms of a preferred embodiment, herein depicted within FIGS. 1 through 10. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 9, depicting a fly trap (herein described as an "apparatus") 10, where like reference numerals represent similar or like parts. In accordance with the principles of the present invention, the apparatus 10 provides a fly trap for naturally attracting and trapping a large plurality of flies within an enclosure without the need for external bait or attracting mechanisms.

As best seen in FIGS. 1 through 4, the apparatus 10 is provided with base 20 and an attachable canopy 21. The base 20 is generally a long, narrow receptacle having a bottom 22, an open top 23, and four flat, trapezoidal sidewalls 24. The sidewalls 24 are joined to the perimeter of the bottom 22 at an obtuse angle to provide a downward flow for a plurality of fly carcasses when the apparatus 10 is emptied. The bottom 22 includes two (2) large cut-outs 25 for emptying the plurality of fly carcasses from the base 20. A pair of removable trays 26 is slidably attached to the bottom 25 for covering the cut-outs 25 during use of the apparatus 10. In the illustrated embodiment, the opposing short sidewalls 24 each include a tray slot 27 for receiving the tray 26. Each tray 26 can also include a handle 28 or other gripping mechanism affixed to an outwardly facing edge.

In a preferred embodiment of the apparatus 10, the base 20 is approximately eighty-four inches (84 in.) long and forty-eight inches (48 in.) wide at the open top 23 and fifty-two inches (52 in.) long and twenty-one inches (21 in.) wide at the bottom 24. The depth of the base 20 is approximately twenty-eight inches (28 in.). The canopy 21 is approximately ninety-six inches (96 in.) long and ninety inches (90 in.) in diameter. Each support frame 30 is approximately one-half inch (½ in.) in diameter. It can be appreciated that the dimensions of the apparatus 10 can vary depending upon the dictates of final design and production.

Figure 2:
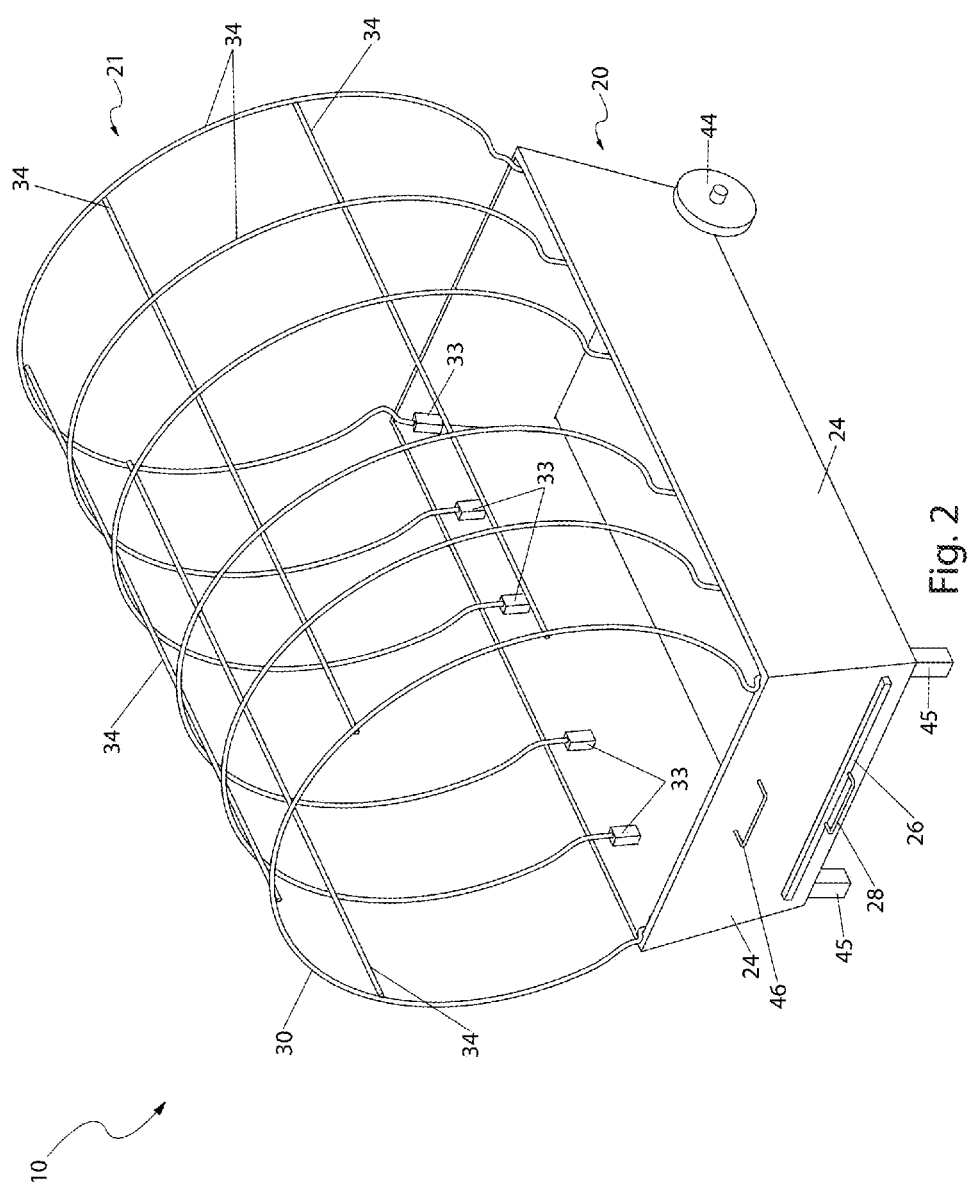
FIG. 2 is a perspective view of a base and a connected canopy with a screen mesh removed.

As best seen in FIGS. 2 and 4, the canopy 21 is connected to an upper perimeter of the base 20 for covering the open top 23 and completely enclosing a hollow interior of the base 20. The hollow interior of the base 20 and the hollow interior of the canopy 21 define a trap chamber 29 of the apparatus 10. The canopy 21 includes a plurality of support frames 30 covered by a screen mesh 31 having an open bottom 32. Each support frame 30 is a rigid rod member having a generally "C"-shape. The plurality of support frames 30 are attached to the base 20 forming a generally cylindrical overall shape for the canopy 21. The screen mesh 31 can be clipped, adhered, strapped, fastened, or otherwise removably or permanently attached to the support frames 30.

As best seen in FIG. 4, a plurality of sleeves 33 is spaced apart along an upper inside surface of each of the long sidewalls 24. Although the inside surface of only a single long sidewall 24 is illustrated for clarity, it should be understood that the opposing and not shown long sidewall 24 includes substantially similar features and is essentially a minor image of that depicted in FIG. 4. The ends of each support frame 30 are bent forming legs 41 for insertion within a corresponding pair of sleeves 33 affixed to opposing sidewalls 24. The bend between the legs 41 and the curved main body of the support frame 30 is such that the curve of the bend encompasses the upper edge of the sidewalls 24 of the base 20. In certain embodiments, the end support frames 47, disposed at each end of the base 20, have legs 41 that have an additional outward bend such that the canopy 21 extends past the ends of the base 20.

Generally, the diameter of the support frames 30, and the canopy 21 as a whole, is larger than the width of the base 20. The number of sleeves 33 and the number of support frames 30 utilized will vary dependant upon the overall length of the base 20. The screen mesh 31 is affixed to the support frames 30 from end to end such that the open bottom 32 is positioned over the open top 23 of the base 20 when the canopy 21 is attached. The lower edge of the screen mesh 31 is positioned within the interior of the sidewalls 24 to eliminate any gap which would allow flies trapped within the trap chamber 29 to escape.

In certain embodiments, the canopy 21 can also include one or more cross supports 34 attached to the support frames 30 extending end to end. The cross supports 34 provide additional rigidity to the canopy when needed. The cross supports 34 can be removably attached or fastened to the curved portion of the support frames 30 by clips, fasteners, or similar mechanisms or can be permanently affixed, inside or outside of the screen mesh 31.

The screen mesh 31 is formed from a suitably durable reticulated material, such as flexible wire mesh, wire fabric, or similar material with a small mesh. The canopy 21 also includes a plurality of apertures 38 and a plurality of feeder tubes 35 throughout the screen mesh 31. The total number of apertures 38 and feeder tubes 35 incorporated into the screen mesh 31 can vary depending upon the overall size of the apparatus 10 or other final design criteria. A limited number of apertures 38 and feeder tubes 35 have been illustrated in the various drawing views for clarity and not as a limitation of scope.

Figure 7:
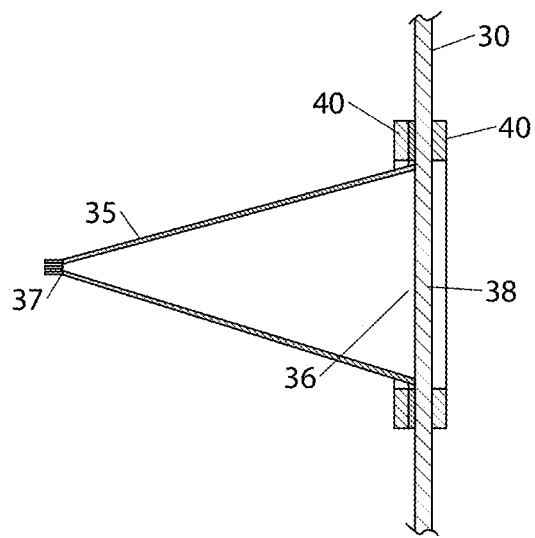
FIG. 7 is a longitudinal cross section view of the screen mesh and attached feeder tube.

As best seen in FIGS. 5 through 7, the feeder tubes 35 are generally conical members formed from a flexible small mesh material having a large opening 36 and a small opening 37. A flanged perimeter of the large opening 36 of each feeder tube 35 is affixed to the perimeter of the aperture 38 providing an entrance for the fly into the feeder tube 35. The small opening 37 provides an exit for the fly and includes a plurality of semi-rigid strands 39 of mesh material projecting outwardly from a perimeter. The plurality of strands 39 allow a fly to exit the feeder tube 35 and access the trap chamber 29 of the apparatus 10 but prevent reentry, thus trapping the fly within the trap chamber 29.

In the illustrated embodiment, the feeder tubes 35 are affixed to the screen mesh 31 about the apertures 38 by sandwiching the flanged perimeter of the large opening 36 and the perimeter of the aperture 38 between a pair of rings 40. A first ring 40 positioned on an exterior of the screen mesh 31 around the aperture 38 and a second ring 40 is positioned on an interior of the screen mesh 31 around the feeder tube 35. The rings 40 are fastened, adhered, or otherwise affixed together. It can be appreciated that the large opening 36 of each feeder tube 35 can be attached, fastened, or affixed to the screen mesh 31 about the perimeter of the apertures 38 by any suitable attachment method. It can also be appreciated that the feeder tubes 35 can be integrally formed into the body of the screen mesh 31 during fabrication eliminating the need for attachment.

Figure 3:
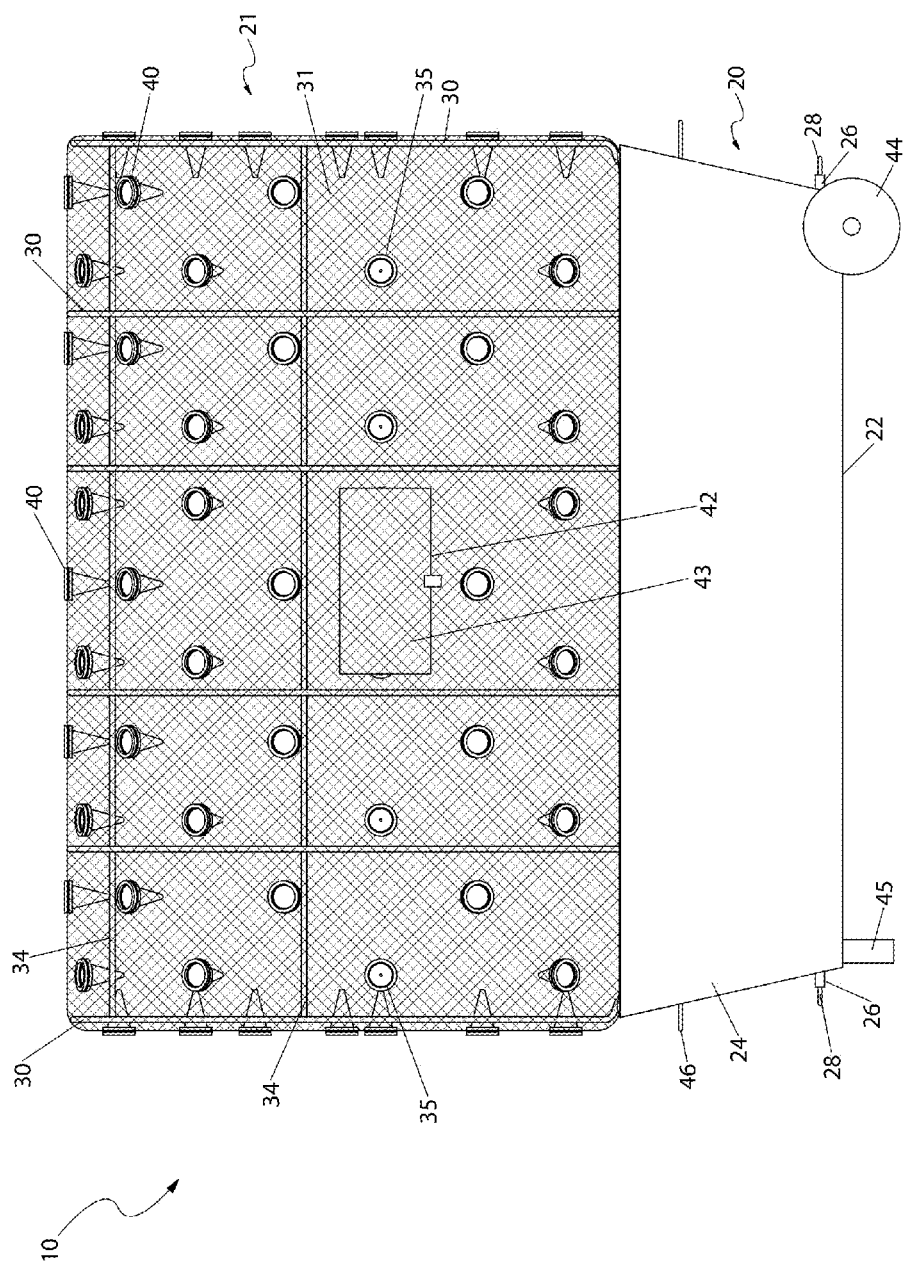
FIG. 3 is side elevation view of the fly trap.

As best seen in FIGS. 3 and 4, in certain embodiments, the canopy 21 also includes an access opening 42. The access opening 42 is illustrated as located near the upper edge of the base 20; however, it can be appreciated that the access opening 42 can be located anywhere along the canopy 21. The access opening 42 also includes an access door 43 hingedly attached to an edge of the access opening 42. The access door 43 can also be made of a flexible material having a small mesh similar to the screen mesh 31. The access door 43 includes a latch or similar closure to ensure the access door 43 is securable in a closed position.

In certain embodiments, the base 20 also includes a plurality of wheel assemblies 44. Two (2) or four (4) wheel assemblies can be used disposed at lower corner locations of the base 20. Each wheel assembly 44 includes expected features, such as a central axle, a bearing, a hub, and the like. As illustrated in the two-wheeled embodiment, the base 20 also includes a pair of support feet 45 at corner locations opposite the wheel assemblies 44. At least one (1) base handle 46 or other grip mechanism can also be affixed to an exterior surface of one (1) or more of the sidewalls 24 for transporting and maneuvering the apparatus 10 on the wheel assemblies 44.

Figure 8:
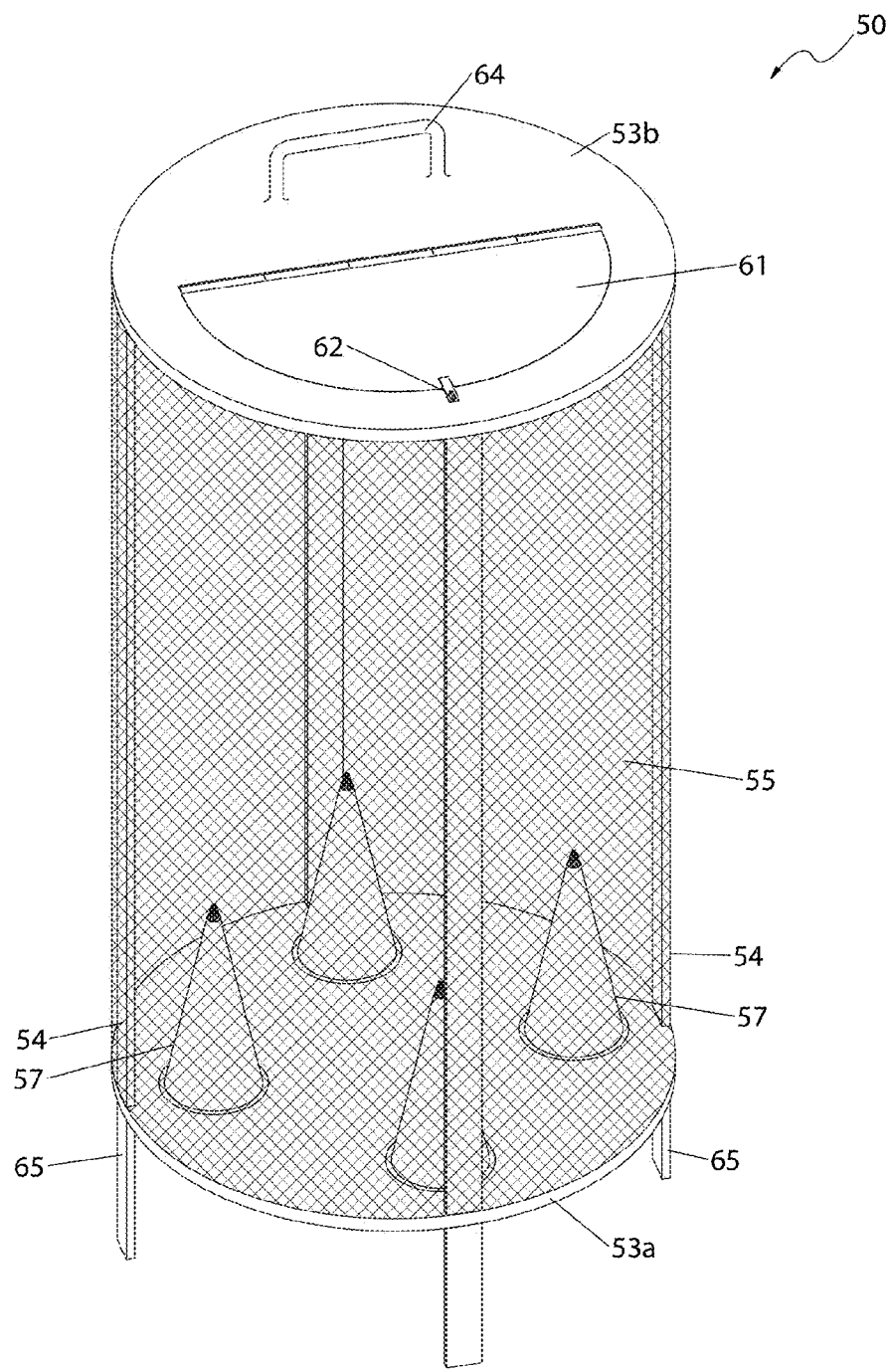
FIG. 8 is a side perspective view of a starter fly trap in accordance with the present invention.
Figures 9, 10:
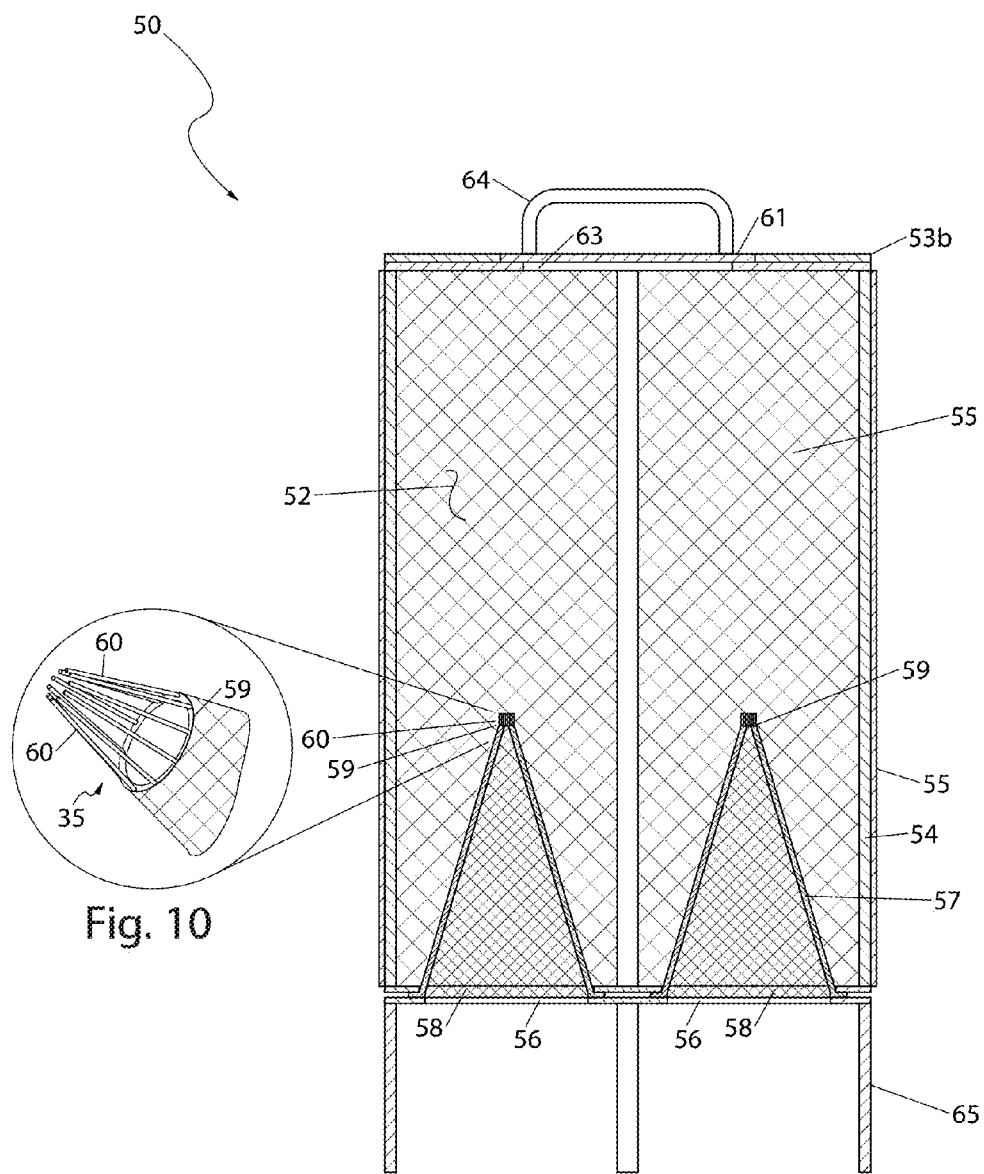
FIG. 9 is a longitudinal cross section view of the starter fly trap in accordance with FIG. 8; and, FIG. 10 is an enlarged view of a small opening of the feeder tube in accordance with FIG. 9.

As best seen in FIGS. 8 and 9, the apparatus 10 can also be provided with at least one starter tube 50 for use in the initial fly catching process needed to "charge" the apparatus 10 with a starting plurality of flies. The starter tube 50 is generally a smaller trapping apparatus and a plurality of starter tubes 50 is spread apart over an area to attract and trap flies or other insects in generally smaller numbers than that of the apparatus 10. The starter tube 50 includes a generally tubular frame 51 including a pair of opposing circular end caps 53 and a plurality of longitudinal supports 54 extending between facing surfaces of the opposing end caps 53. A screen mesh 55 is attached around an exterior of the longitudinal supports 54 and extends between the end caps 53 to define a hollow interior chamber 52 for retaining and trapping flies.

In a preferred embodiment of the apparatus 10, the starter tube 50 is approximately sixty-two inches (62 in.) long and thirty-five inches (35 in.) wide. Each longitudinal support 54 is approximately one-half inch (½ in.) wide. It can be appreciated that the dimensions of the starter tube 50 can vary depending upon the dictates of final design and production.

The screen mesh 55 is substantially similar to the screen mesh 31 described above and is formed from any suitably durable reticulated material, such as flexible wire mesh, wire fabric, or similar material with a small mesh.

A lower end cap 53 also includes a plurality of apertures 56 and a plurality of feeder tubes 57. The total number of apertures 56 and feeder tubes 57 incorporated into the lower end cap 53a can vary depending upon the overall size of the starter tube 50 or other final design criteria. Four (4) apertures 56 and feeder tubes 57 have been illustrated in FIG. 8 for clarity and not as a limitation of scope.

As best seen in FIGS. 9 and 10, similar to the feeder tubes 35 described above, the feeder tubes 57 of the starter tube 50 are generally conical members formed from a flexible small mesh material having a large opening 58 and a small opening 59. A flanged perimeter of the large opening 58 of each feeder tube 57 is affixed to a perimeter of each lower end cap aperture 56 providing an entrance for the fly into the feeder tube 57. The small opening 59 provides an exit for the fly and includes a plurality of semi-rigid strands 60 of mesh material projecting outwardly from a perimeter. The plurality of strands 60 allow a fly to exit the feeder tube 57 and access the trap chamber 52 of the starter tube 50 but prevent reentry, thus trapping the fly within the chamber 52.

In a preferred embodiment, the end caps 53 each have two layers of material affixed together. As best seen in the cross section view of FIG. 9 bisecting two of the feeder tubes 57, the flanged perimeter of the large opening 58 is sandwiched and affixed between the two layers of the lower end cap 53a. Each layer of the lower end cap 53a includes aligned apertures 56. It can be appreciated that the large opening 58 of each feeder tube 57 can be attached, fastened, or affixed to the lower end cap 53a about the perimeter of the apertures 56 by any suitable attachment method.

The upper end cap 53b also includes an opening 63 and a hingedly attached lid 61 for covering the opening 63 and accessing the interior chamber 52 in order to empty the plurality of trapped flies into the large chamber 29 of the apparatus 10. A clasp 62 is provided for securing the lid 61 in a closed position. The clasp 62 can be any suitable mechanical closure mechanism affixed to the top surface of the upper end cap 53a and removably coupled to the edge of the lid 61. Preferably a lower layer of the two layer combination of the upper end cap 53b includes a smaller opening and the upper layer of the two layer combination includes a slightly larger opening, such that the lower layer provides a perimeter lip to support the lid 61 when in the closed position.

The upper end cap 53b can also include a handle 64 or other gripping mechanism affixed to the top surface for carrying the starter tube 50. Four (4) legs 65 are affixed to and extend outwardly from a bottom surface of the lower end cap 53a. It can be appreciated that any plurality of legs 65 can be utilized. The legs 65 are preferably nine inches (9 in.) long and allow the starter tube 50 to be positioned in a generally vertical orientation.

It can be appreciated by one skilled in the art that other styles and configurations of the present invention can be easily incorporated into the teachings of the present disclosure and only certain particular configurations have been shown and described for purposes of clarity and disclosure and not by way of limitation of scope.

In accordance with the principles of the present invention, the various embodiments can be utilized by the user in a simple and effortless manner with little or no training in general accordance with FIG. 1 through FIG. 9. It can be appreciated that the steps described can be performed in alternative order and as such should not be viewed as a limiting factor.

Prior to use, the apparatus 10 would be installed by moving the base 20 to a desired outdoor location, preferably in an area where fly infestation is heavy. The canopy 21 is attached to the base 20 by inserting the legs 41 of each support frame 30 into corresponding opposing pairs of sleeves 33. The combined base 20 and canopy 21 form the large trap chamber 29.

During use, the apparatus 10 is "charged" by adding a plurality of flies to the trap chamber 29. The apparatus 10 utilizes the hoarding mentality of flies, by using a plurality of flies to attract and thus trap large numbers of additional flies. One (1) or more of the starter tubes 50 are used to trap the initial plurality of flies for application into the chamber 29 of the apparatus 10. Other types of live fly traps can be used to collect the initial plurality of live flies. The plurality of live flies are applied to the trap chamber 29 through the access opening 42 and enclosed by closing and securing the access door 43. As the flies begin to fly around the trap chamber 29, the noise and motion attracts additional number of flies who individually or in groups enter the chamber 29 through the feeder tubes 35. Upon exiting the small opening 37 of the feeder tubes 35, the strands 39 expand to allow the fly to exit. The strands 39 return to an un-flexed position, essentially closing the small opening 37 and trapping the fly within the chamber 29. If a fly attempts to reenter the feeding tube 35 through the small opening 37, the strands 39 will mortally wound the fly by piecing its exoskeleton or tearing its wings.

Once the base 20 is full of fly carcasses, the user can easily empty the apparatus 10 and dump the dead flies. Preferably a trench is dug in a suitable area. The apparatus 10 is moved over the trench. The trays 26 are removed from the tray slots 27 and the fly carcasses fall through the cut-outs 25 into the trench. Once empty, the trays 26 are reinserted, covering the cut-outs 25 and the apparatus 10 is moved back to a desired location. The trench is then covered by earth to bury the fly carcasses.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A fly trap apparatus comprising:
   a base comprising a bottom, a longitudinal first sidewall, a longitudinal second sidewall laterally opposed from said first sidewall, a lateral third sidewall, and a lateral fourth sidewall longitudinally opposed from said third sidewall, said first, second, third, and fourth sidewalls defining a lower trap chamber having an open top, said base further comprising a plurality of spaced apart sleeves affixed to an upper inside surface of said laterally opposed first and second sidewalls;
   a plurality of support frames removably connected to said base, each support frame of said plurality of support frames comprising a curved main body having a first end and an opposed second end, said first and second ends each comprising a leg, said leg being received by a corresponding sleeve of said plurality of sleeves;
   a screen mesh attached around said plurality of support frames, said screen mesh covering said open top and defining an upper trap chamber; and,
   a plurality of feeder tubes affixed to said screen mesh, wherein each feeder tube of said plurality of feeder tubes extends into said upper trap chamber and is adapted to provide an entrance into said upper and lower trap chamber for flies.

2. The apparatus of claim 1, wherein said leg is bent at a non-zero angle relative to said curved main body of said support frame, and wherein a portion of said curved main body proximate said leg encompasses an upper edge of said first and second sidewalls.

3. The apparatus of claim 1, wherein each of said feeder tubes comprises a conical shape further comprising a large opening affixed to said screen mesh for entrance into said feeder tube and a small opening for exiting said feeder tube, said small opening comprises a plurality of semi-rigid strands projecting outwardly from a perimeter edge for providing a one-way opening.

4. The apparatus of claim 1, wherein said bottom of said base comprises a pair of cut-outs and a pair of removably inserted trays for covering said cut-outs.

5. The apparatus of claim 4, wherein said first, second, third, and fourth sidewalls of said base are disposed at an obtuse outward angle relative to said bottom adapted to direct a plurality of fly carcasses toward said cut-outs.

6. A fly trap apparatus comprising:
   a base comprising a bottom, a longitudinal first sidewall, a longitudinal second sidewall laterally opposed from said first sidewall, a lateral third sidewall, and a lateral fourth sidewall longitudinally opposed from said third sidewall, said first, second, third, and fourth sidewalls defining a lower trap chamber having an open top, said base further comprising a plurality of spaced apart sleeves affixed to an upper inside surface of said laterally opposed first and second sidewalls;
   a plurality of generally "C"-shaped support frames removably connected to said base, each support frame of said plurality of support frames comprising a curved main body having a first end and an opposed second end, said first and second ends each comprising a leg, said leg being received by a corresponding sleeve of said plurality of sleeves, said leg being bent at a non-zero angle relative to said curved main body, a portion of said curved main body proximate said leg hangs over an upper edge of said first and second sidewalls;

a screen mesh attached around said plurality of support frames, said screen mesh encompasses said upper edge of said first, second, third, and fourth sidewalls covering said open top and defining an upper trap chamber configured for collecting flies;

a plurality of apertures disposed throughout said screen mesh; and, a plurality of feeder tubes depending inwardly from said plurality of apertures adapted to provide an entrance to said upper and lower trap chamber for said plurality of flies.

7. The apparatus of claim 6, wherein each of said feeder tubes comprises a conical shape further comprising a large opening affixed to a perimeter of each of said apertures for entrance into said feeder tube and a small opening for exiting said feeder tube.

8. The apparatus of claim 7, wherein said feeder tube small opening comprises a plurality of semi-rigid strands projecting outwardly from a perimeter edge for providing a one-way opening.

9. The apparatus of claim 8, wherein said base comprises a pair of cut-outs disposed in said bottom and a pair of removably inserted trays for covering said cut-outs.

10. The apparatus of claim 9, wherein said first, second, third, and fourth sidewalls of said base are disposed at an obtuse outward angle relative to said bottom adapted to direct a plurality of fly carcasses toward said cut-outs.

11. The apparatus of claim 10, wherein said first and second sidewalls each comprises a tray slot for insertably receiving said trays.

12. The apparatus of claim 10, wherein said screen mesh comprises an access opening for accessing said trap chamber and an access door hingedly attached to said access opening.

13. The apparatus of claim 10, wherein each of said feeder tubes is affixed to said perimeter of each of said apertures between a pair of rigid rings affixed together.

14. The apparatus of claim 10, wherein said base further comprises a base handle affixed to an exterior of at least one of said lateral sidewalls.

15. The apparatus of claim 10, further comprising at least one cross support attached to said plurality of support frames.

16. The apparatus of claim 10, wherein said base further comprises a pair of wheel assemblies disposed at a lateral end of said bottom and a pair of support feet disposed at an opposing lateral end of said bottom.

\* \* \* \* \*